United States Patent
Fletcher

(10) Patent No.: US 11,871,138 B2
(45) Date of Patent: Jan. 9, 2024

(54) VIRTUALIZED PRODUCTION SWITCHER AND METHOD FOR MEDIA PRODUCTION

(71) Applicant: Grass Valley Canada, Montreal (CA)

(72) Inventor: Ian David Fletcher, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 163 days.

(21) Appl. No.: 17/450,554

(22) Filed: Oct. 11, 2021

(65) Prior Publication Data
US 2022/0116548 A1    Apr. 14, 2022

Related U.S. Application Data

(60) Provisional application No. 63/091,092, filed on Oct. 13, 2020.

(51) Int. Cl.
*H04N 5/262* (2006.01)
*H04N 5/268* (2006.01)
(Continued)

(52) U.S. Cl.
CPC ........... *H04N 5/268* (2013.01); *G06F 3/0482* (2013.01); *G06N 20/00* (2019.01); *H04N 5/222* (2013.01); *H04N 5/2224* (2013.01); *H04N 5/262* (2013.01); *H04N 21/4431* (2013.01); *H04N 21/4622* (2013.01)

(58) Field of Classification Search
CPC .............................. H04N 5/262; H04N 5/2224
See application file for complete search history.

(56) References Cited

U.S. PATENT DOCUMENTS 6,952,221 B1 * 10/2005 Holtz .................... G11B 27/034
7,024,677 B1 *  4/2006 Snyder ................. G11B 27/031
                                                                725/86
(Continued)

FOREIGN PATENT DOCUMENTS

KR          101894956 B1 * 10/2018    ............. G06Q 50/10

OTHER PUBLICATIONS

English Translation of KR-101894956-B1, accessed on May 18, 2023 (Year: 2023).*

(Continued)

*Primary Examiner* — Daniel Rodriguez
(74) *Attorney, Agent, or Firm* — ARENTFOX SCHIFF LLP

(57) ABSTRACT

A virtualized production switcher for media production is provided that includes a script database that stores predefined macros that each define a script for applying media production functions to media content, and a script optimizer that selects a subset of the predefined macros to be presented on a user interface as suggested scripts for each of a plurality of scenes of a media stream. Moreover, a program generator receives a user input via the user interface that selects one of the predefined macros and applies the corresponding script to a selected scene of the media stream for a media production by applying the at least one media production function to the selected scene based on an identified key-frame thereof. A script profiler identifies metadata related to the selected scene and updates the script database to store a correspondence between the selected scene and the selected predefined macro.

25 Claims, 6 Drawing Sheets

(51) Int. Cl.
    *H04N 21/443*     (2011.01)
    *H04N 21/462*     (2011.01)
    *G06F 3/0482*     (2013.01)
    *G06N 20/00*     (2019.01)
    *H04N 5/222*     (2006.01)

(56) References Cited

U.S. PATENT DOCUMENTS

| | | | | |
|---|---|---|---|---|
| 8,560,951 | B1* | 10/2013 | Snyder | G11B 27/34 715/731 |
| 9,066,049 | B2* | 6/2015 | Scoggins, II | H04N 9/475 |
| 10,432,987 | B2* | 10/2019 | Surcouf | H04N 21/854 |
| 2002/0109710 | A1* | 8/2002 | Holtz | G11B 27/034 |
| 2004/0027368 | A1* | 2/2004 | Snyder | H04N 5/268 348/E5.057 |
| 2004/0070690 | A1* | 4/2004 | Holtz | H04N 21/2665 345/472 |
| 2008/0225179 | A1* | 9/2008 | Casper | H04N 5/222 348/E5.022 |
| 2008/0231758 | A1* | 9/2008 | Casaccia | G11B 27/034 348/E5.022 |
| 2011/0029099 | A1* | 2/2011 | Benson | G11B 27/034 700/17 |
| 2013/0151970 | A1* | 6/2013 | Achour | G06Q 10/101 715/723 |
| 2014/0310746 | A1* | 10/2014 | Larsen | H04N 21/4302 725/37 |
| 2019/0035431 | A1* | 1/2019 | Attorre | G11B 27/34 |
| 2019/0348077 | A1* | 11/2019 | Holtz | H04N 21/440272 |

OTHER PUBLICATIONS

English Translation of KR-101894956-B1 published on Oct. 24, 2018 (Year: 2018).*

* cited by examiner

VIRTUALIZED PRODUCTION SWITCHER AND METHOD FOR MEDIA PRODUCTION

CROSS REFERENCE TECHNICAL FIELD

The present application claims priority to U.S. Provisional Application No. 63/091,092, filed Oct. 13, 2020, the contents of which are hereby incorporated by reference in its entirety.

TECHNICAL FIELD

The present invention relates to media production, and, more particularly, to a system and method for providing a virtualized production switcher for media production.

BACKGROUND

In media production, a production switcher or video production switcher is a device used that can select between several (or many) different video sources and often composite video sources together to create special effects. Typically, a production switcher is controlled by its operator, who is known as a technical director ("TD"). However, during live video production, decisions required for the media production can be difficult, especially when the TD is required to make a decision quickly and when dealing with numerous video feeds used for a particular production, such as a sporting event. These types of decisions can include video effects that can be used to produce transitions and/or transformations of still or moving pictures or rendered visual objects. Typical examples of video effects include, but are not limited to, video image three-space transforms such as scaling, locating, rotating, and the like; pixel-based video image processing such as defocus, chromatic shift and the like; and other manipulations or combinations of transformations such as bending, slicing, or warping of the video image surface(s) into different forms.

To help facilitate the TD's video production, there are conventional techniques where, for example, key stroke sequences of the production switcher can be "learned" and repeated later, such as in the form of a keyboard macro. However, as the production environment and infrastructure continues to grow with more complex video effects, larger scales of video content capture (e.g., increasing camera feeds from a particular live event) and the like, a system and method is needed to facilitate the TD's continuing efforts to manage such media content production.

SUMMARY OF THE INVENTION

Accordingly, a system and method is disclosed herein for providing a virtualized production switcher for media production. In an aspect, media processing functions can be implemented in a macro and can be used as the "compiled form" of a script that can be learned and dynamically optimized. Thus, using the virtualized production switcher, scripts can be deduced and suggested for use to execute transitions, identify sources and effectively any variable that is part of the script. As a result, the virtualized production switcher provides a system that is customized and directed to a specific operator of the system and also to the specific type of content to facilitate script selection for a scene that is part of a show in a media content production.

According to an exemplary embodiment, a virtualized production switcher is provided for media production that includes a script database storing a plurality of predefined macros that each define a usage of a script for applying at least one media production function to media content. Moreover, the system includes a receiver configured to receive at least one media content stream that includes a plurality of scenes and a plurality of shots for the media production, and a display screen configured to provide a user interface that displays at least a portion of the respective scenes of the plurality of media streams. Furthermore, the virtualized production switcher configures a script optimizer that selects a subset of the plurality of predefined macros that are presented on the user interface as suggested scripts for each scene of the plurality of media streams; a program generator that receives a user input that selects one of the predefined macros and applies the corresponding script to a selected scene of the at least one media content stream for a media production by applying the at least one media production function to the selected scene based on an identified keyframe thereof; and a script profiler that identifies metadata related to the selected scene and update the script database to store a correspondence between the selected scene and the selected predefined macro, wherein the metadata relates to at least one of a type of content, an image recognized in the content and a camera profile used to capture the respective media content. The script optimizer is also configured to update the subset of the plurality of predefined macros to be presented on the user interface based on the correspondence and present the updated subset of predefined macros on the user interface when another media stream is displayed on the user interface that has metadata the matches the identified metadata.

According to another exemplary aspect, the plurality of predefined macros comprise a plurality of data types and classes that define a structure and function to execute the at least one media production function on the media content. Moreover, in one aspect, the at least one media production function comprises at least one of a parametric control, a video level control, and a transition for the media content.

According to another exemplary aspect, the virtualized production switcher includes a user interface generator configured to separate the media content into plurality of scenes and shows and to generate the user interface to display the plurality of scenes for the at least one media content stream, which is determined based on a key-frame for each sequence of the media content.

According to another exemplary aspect, the script profiler includes a content analyzer configured to determine at least one of audio triggers and video content recognition features to identified the metadata relating to media essence of the selected scene.

Yet further, the script optimizer can be configured to update the selected subset of the plurality of predefined macros that are presented on the user interface using machine learning or artificial intelligence to customize the suggested scripts presented on the user interface based on historical operations of applying the at least one media production function for the media production. In a refinement of this aspect, the script optimizer is configured as a dynamic feedback loop that builds a customized profile for the video production to generate the subset of the plurality of predefined macros to be presented on the user interface.

In another exemplary aspect, a virtualized production switcher for media production is provided that includes a script database configured to store a plurality of predefined macros that each define a script for applying at least one media production function to media content; a display screen configured to provide a user interface that displays a plurality of scenes of a media stream of the media content;

a script optimizer configured to select of a subset of the plurality of predefined macros that are presented on the user interface as suggested scripts for each of the plurality of scenes; a program generator configured to receive a user input that selects one of the predefined macros and to apply the corresponding script to a selected scene of the media stream for a media production by applying the at least one media production function to the selected scene based on an identified key-frame thereof; a script profiler configured to identify metadata related to the selected scene and update the script database to store a correspondence between the selected scene and the selected predefined macro; wherein the script optimizer is configured to update the subset of the plurality of predefined macros to be presented on the user interface based on the correspondence and present the updated subset of predefined macros on the user interface when another media stream is displayed on the user interface that comprises metadata related to the identified metadata.

In another exemplary aspect, a virtualized production switcher for media production is provided that a script database configured to store a plurality of predefined macros that each define a script for applying at least one media production function to media content; a script optimizer configured to select of a subset of the plurality of predefined macros to be presented on a user interface as suggested scripts for each of a plurality of scenes of a media stream; a program generator configured to receive a user input via the user interface that selects one of the predefined macros and to apply the corresponding script to a selected scene of the media stream for a media production by applying the at least one media production function to the selected scene based on an identified key-frame thereof; a script profiler configured to identify metadata related to the selected scene and update the script database to store a correspondence between the selected scene and the selected predefined macro; wherein the script optimizer is configured to update the subset of the plurality of predefined macros to be presented on the user interface based on the correspondence.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
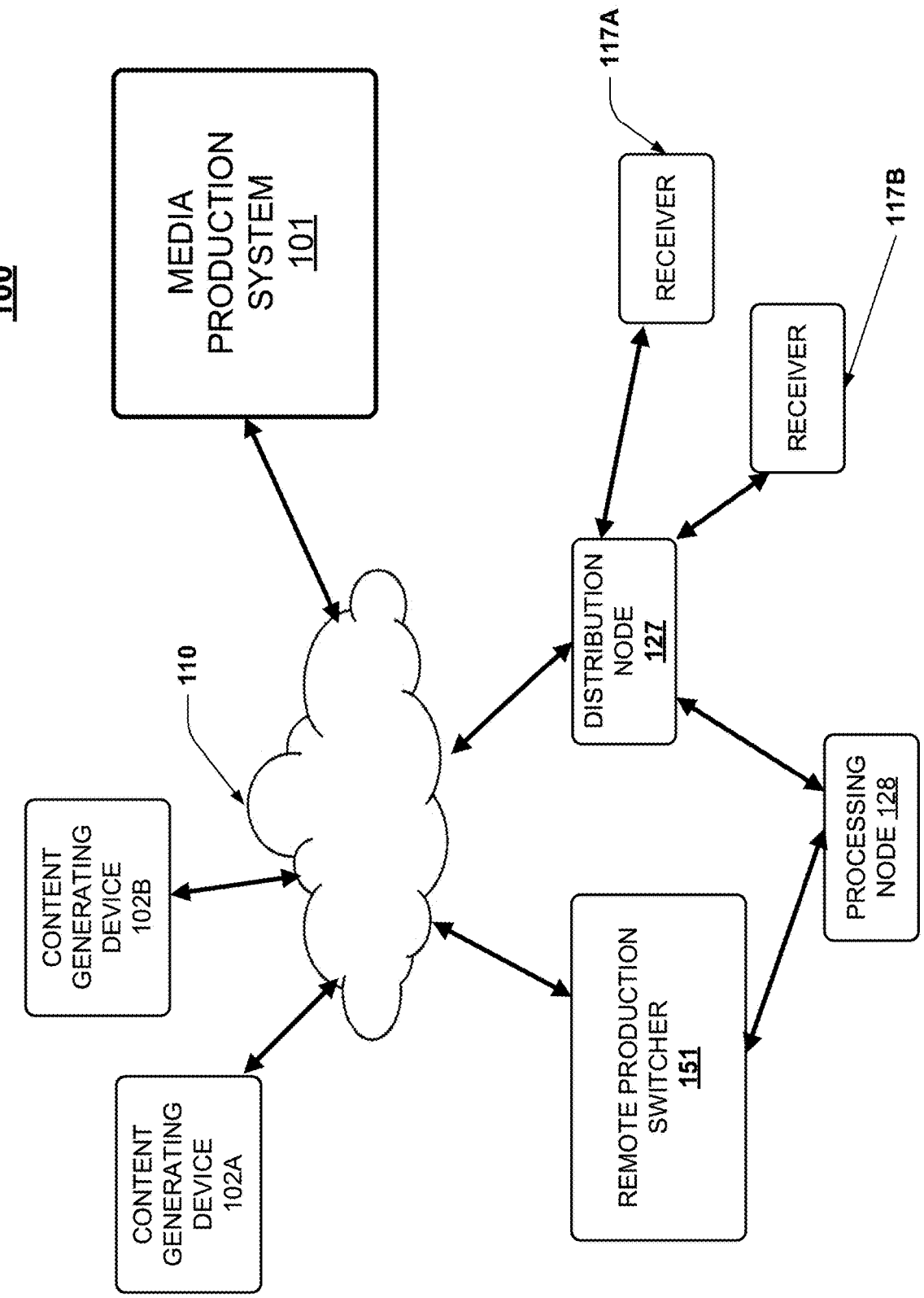
FIG. 1 illustrates a block diagram of a system for providing a virtualized production switcher for media production according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the system and method for providing a virtualized production switcher for media production will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a system for providing a virtualized production switcher for media production according to an exemplary embodiment. As will be described in detail below, the exemplary system 100 includes a virtualized production switcher that is configured to select and present one or more predefined (or pre-built or pre designed) macros that are presented on a user interface as suggested scripts for a TD to apply a media production process (e.g., a transition) to a scene of media content. Moreover, the virtualized production switcher is configured to receive a user input that selects the predefined macro and applies the corresponding script to a selected scene for a media production by applying the media production function to the selected scene based on an identified key-frame thereof. In this aspect, key-frames are the In and Out points for applying any transition(s) to a production. Thus, in an exemplary aspect, a script (e.g., which can be considered a type of template) is a sequence of events (e.g., process steps) that are applied to the media in alignment with the media. The start point, and other change points, are identified as "key-frames" by the script. As such, a macro is the executable command, which based upon the script, contains a particular set of processing functions to be applied to a particular set of essence in alignment with the key frames.

In general, media content provided for production according to system 100 can generally be referred to as "essence", which denotes media that can be consumed by a user (e.g., a video clip, an audio clip, and/or ancillary data such as captions). As shown, the system 100 includes a media production system 101, which can provide or otherwise configure the virtualized production switcher to facilitate a video production on a user interface in terms of applications and components of the system and the connections between them for consumption of media essence by end users. The virtualized production switcher can be configured as a software based environment that can be provided in a cloud-computing environment, remote production center, production truck or the like, as would be appreciated to one skilled in the art. It is also noted that the exemplary embodiment is described in the context of media production and specifically live or real-time media production or broadcast.

FIG. 1 illustrates a block diagram that is specific to a live media production environment. In general, it should be understood that the media production system 101 is configured to facilitate streamlined and efficient media production for a TD. Thus, the media production system 101 can generally be located remotely from all of the other components in the system and, in some embodiments, coupled to the components (which can be part of a cloud computing environment) to effectively control the system.

As shown, system 100 includes a plurality of content generating devices 102A and 102B. In an exemplary aspect, the plurality of content generating devices 102A and 102B can be configured for an A/V feed across links via the network 110. Moreover, it is noted that while only two devices are shown, the system 100 can be implemented using any number of content generating devices. The plurality of content generating devices 102A and 102B can also include, for example, remote camera's configured to capture live media content, such as the "talent" (e.g., news broadcasters, game commentators, or the like). Moreover, the content generating devices 102A and 102B can include Esports (electronic sports) real-time content, or the like. In general, it should be appreciated that while the exemplary aspect uses content generating devices 102A and 102B (which may be located at a live event, for example), a similar configuration can be used for a remote video server, for example, that is provided as a content providing device that is configured to store media content and/or distribute this content through the media distribution network.

As further shown, the plurality of content generating devices 102A and 102B can be coupled to a communication network, such as the Internet 110, and/or hardware conducive to internet protocol (IP). That is, system 100 can be comprised of a network of servers and network devices configured to transmit and receive video and audio signals of various formats. As noted above, in one aspect, the processing components of system 100 can be executed in part of a cloud computing environment, which can be coupled to network 110. Moreover, the media production system 101 can be configured to access the video and audio signals and/or feeds generated by the content generating devices 102A and 102B, or information related to the various signals and content presented therein, as will be described in detail below.

In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. Thus, according to an exemplary aspect, one or more of the components (or work packages) of system 100 that can be implemented in the cloud platform as described herein.

As yet further shown, system 100 can include one or more remote distribution node(s) 127, one or more processing node(s) 128, and one or more remote production switcher(s) 151. As noted above, these components can be implemented as hardware components at various geographical locations or, in the alternative, as processing components as part of a cloud computing environment. The one or more distribution nodes 127 (e.g., electronic devices) are configured to distribute the production media content from the media production system 101 to one or more distribution nodes (e.g., remote media devices), such as receivers 117A and 117B, which can be content consuming devices (e.g., televisions, computing devices, tablets, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. As a result, the system 100 can be configured as a media network for real-time production and broadcasting of video and audio content.

Yet further, system 100 can include additional components that are typically included a video production system that are well known to those skilled in the art and are not shown in FIG. 1. For example, in certain exemplary aspects, system 100 can include one or more codecs configured to encode in the video signals at a particular compression format for the transmission to satisfy the media request parameters. In general, such codecs are configured to perform encoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

Moreover, in this network, distribution node(s) 127 can further be configured to distribute the media content throughout the distribution network to one or more processing node(s) 128, which may include a mix/effects engine, keyer or the like. In addition, remote distribution node(s) 127 can be configured to feed remote processing node(s) 128 via a direct link, or via Internet 103 connection. Examples of remote distribution node(s) 127 and processing node(s) 128 may include remote production switches similar to remote production switcher 151 or remote signal processors.

According to an exemplary aspect, the virtualized production switcher is configured to provide a simpler engine for creating video productions than existing systems, especially to enable operators (e.g., TDs) who are not familiar with traditional production switcher concepts. As will be described herein the virtualized production switcher facilitates a single user operation for vision switching, clips, graphics and audio and the like. To do so, the virtualized production switcher is configured to break down or separate a show into a plurality of scenes and shots, such that an operator can be presented with far fewer options at any given instance or time than using conventional systems. Moreover, the options can be presented on a configurable user interface as a visual story board. The use of scenes also helps with operator visualization of multi-node processing and provides vital context for future artificial intelligence (AI) assist modes as will also be described below.

For purposes of this disclosure, it is noted that the processing of media content can be characterized into three building blocks: shots, scenes and shows. Shots are the basic building blocks of a scene and can be classified as four different types live, clip, image, and singular graphic. Thus, in an aspect, the shot can be a simple source of media essence (e.g., live content received from a production camera (such as content generating devices 102A and/or 102B) or a more complex, multi-layered element. For example, a shot can have multiple layers (e.g., 8 layers) with each layer being a key or another source resized and positioned. In one aspect, a layer can be created through a key, which as known to a person skilled in the art is an area in a frame that can be filled with other content (e.g., putting a foreground into a background or the like). Moreover, in an exemplary aspect, layers can have independent transitions (e.g., cuts, mixes, wipes, slides, pushes, squeezes or the like) and can happen within layers when changing shots.

A scene is a collection of one or more shots and represents a section of a production. For example, scenes may represent time, such as "show opening", "section 1" or, in live events, such as soccer game with a "touchline," "wide shots", "replay", "penalty kick" and the like. Moreover, in an exemplary aspect, a scenes can have an additional plurality of layers (e.g., 8 layers) that can be applied to all shots in that scene. Scenes can have optional animated wipes in and out and can contain the audio sources that are presented to the operator when that scene is active.

Finally, a show is a collection of scenes for the video production. As described herein, the virtualized production switcher is configured to enable an operator, such as a TD, to apply a customized and predefined script to each scene for the video production. Thus, in one aspect, the scene can have optional shots that can be applied to everything, such as graphics, logos or timers that are used across multiple scenes, as well as full-screen elements that can be provided to at any point, such as black or standby content.

Figure 2:
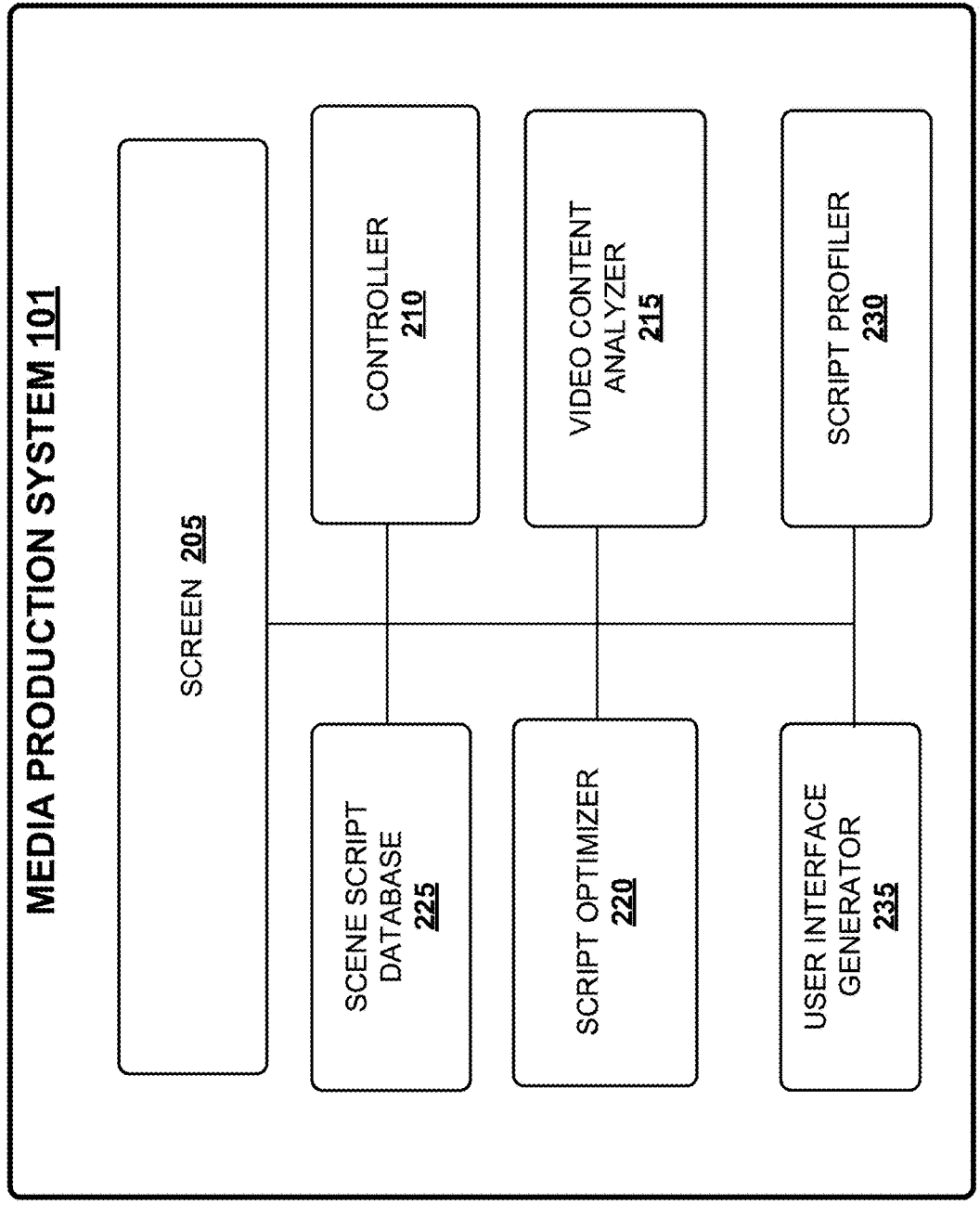
FIG. 2 illustrates a block diagram of the media production system for providing a virtualized production switcher for media production according to an exemplary embodiment.

FIG. 2 illustrates a block diagram of the media production system 101 for providing a virtualized production switcher for media production according to an exemplary embodiment. In general, the media production system 101 can be implemented on one or more computing devices that is communicatively coupled to the network for media production as shown above. Moreover, the media production system 101 includes a plurality of components for executing the algorithms and techniques described herein.

More specifically, the media production system 101 can be configured as a virtualized production switcher and can include a controller 210, a video content analyzer 215, a script optimizer 220, a scene script database 225, a script profiler 230 and a user interface generator 235. Moreover, a user interface (e.g., graphic or touch controlled user interface) can be provided on a screen that enables the TD to control the video production using the techniques and algorithms described herein.

In general, the scene script database 225 can be implemented as electronic memory configured to store the one or more macros for executing a predefined scene script, as will be described in more detail below. In general, a macro or object can be a database record that includes different data types and classes. The types and classes form a structure and functions can then be written that operate on the objects. In other words, each macro contains one or a plurality of functions that are designed and configured to operate correctly for each class, or type, included in a given object. Alternative, the functions will return a null when a class, or type, is not present in a particular object.

Thus, in a particular aspect, the script database 225 is configured to store a plurality of predefined macros that each define one or more scripts for applying one or more media production function to media content. In other words, each predefined script is configured as a framework for production operations for a scene over an event interval, with such operations including, for example, parametric controls, video levels, transitions, chroma, wipes, keys, and the like. That is, event sequences can be delineated with key frames, as described above, and this complete list of events, and trigger key frames can be driven to a time line, traditionally SMPTE timecode, but also to time stamps traceable to PTP (precision time protocol), for example. Moreover, as will be discussed in greater detail below, the predefined scripts can be presented to an operator based on the context and content of the scene to be operated.

According to an exemplary aspect, each of the controller 210, the video content analyzer 215, the script optimizer 220, the scene script database 225, the script profiler 230 and the user interface generator 235 can be implemented as software engines or modules configured for executing the algorithms disclosed herein, for example. The term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As described above, the media production system 101 (i.e., the virtualized production switcher) can be configured to receive content from a plurality of remote sources, such as live production cameras, video servers, graphics databases, or the like. Thus, in an exemplary aspect, the virtualized production switcher can include receiving channels, such as input ports, as part of a receiver for receiving one or more media content streams from such these remote sources.

In addition, the media production system 101 can include a user interface generator 235 for generating a presenting/displaying a user interface for controlling and operating the virtualized production switcher on a screen 205. In general, the screen 205 can be included in the system or coupled thereto and can be a conventional computer screen (e.g., touchscreen interface) for receiving operator input for selecting predefined scene scripts for the video production process.

Upon receiving the plurality of media content streams, the user interface generator 235 can be configured to separate the content into shots, scenes and/or shows as described above. Thus, in a specific aspect, the user interface generator 235 is configured to generate the user interface to show a plurality of scenes for each stream, which can be determined based on a key-frame for each sequence, which is generally understood as the first frame of an event of a scene sequence (e.g., a transition). For example, an I-frame or JPEG still image can be a key-frame that can be identified by the media production system 101 using conventional techniques to separately present the scenes to the operator on the user interface of screen 205. As noted above, by breaking down a show into a plurality of scenes and shots, the virtualized production switcher is configured to present fewer options at any a given instance to the TD for show production. Furthermore, it should be understand that a script can include more than one key frame because it might include more than one transition/effect, for example. As described above, the key frame is where the new transition/event starts within the script in this example. Thus, in a compressed stream, I frame can be a substitute whereas with JPEG, any frame can substitute.

As further shown, the virtualized production switcher 101 can include a script optimizer that is configured to select of a subset of the plurality of predefined macros that can then be presented on the user interface of the screen 205 as suggested and/or customized scripts for each scene of the plurality of media streams. For example, in one aspect, a video content analyzer 215 is configured to determine metadata relating to the actual content of a particular scene of the media essence. This metadata can be an indication of the type of content, for example, identifying the particular camera, camera location, type of live event (e.g., soccer game), timing of the live event, and the like. In one aspect, the video content analyzer 215 can be configured to analyze the audio announcement for certain audio clues or triggers. Alternatively, or in addition thereto, the video content analyzer 215 can include video content recognition features that is capable of recognizing specific content in the media essence. For example, if the essence is a live stream of a soccer game, the video content recognition features can be configured to recognize the name of the player or team, or even incidents that occur in the game, such as a penalty kick being awarded or a yellow or red card being issued to a player. That is, the video content analyzer 215 can be trained to determine based on player position and the like that a certain event (such as a penalty kick) has been awarded.

Such content recognition software and applications is known in the art. An example of video recognition and item tracking is described in U.S. Pat. No. 10,636,152, entitled System and Method of Hybrid Tracking for Match Moving", the contents of which are incorporated by reference in its entirety.

Based on the identified metadata relating to the media essence, the video content analyzer 215 is configured to provide this video essence metadata to the script optimizer 220 that, based on the received metadata, can select a subset of the plurality of predefined macros that can then be presented on the user interface of the screen 205 as suggested and/or customized scripts for each scene of the plurality of media streams. For example, if the media essence metadata (also referenced to as essence characterizing metadata) identifies a particular scene of the media essence (e.g., a penalty shot in a soccer game), the script optimizer 220 can be configured to search the scene script database based on the essence characterizing metadata to identify one or more scene scripts that are appropriate for and/or correspond to the particular penalty kick scene. In other words, there is a determined correspondence between the essence characterizing metadata and the one or more scene scripts to be queued to the operator.

Accordingly, each macro can also be associated with corresponding characteristics to associate its applicability to a given scene. Then by matching the one or more scene scripts to the essence characterizing metadata, the script optimizer 220 can be configured to present each scene script as an available option on the user interface for selection by the operator (e.g., TD) to apply the selected script to a scene to produce a show by applying the functions defined by the selected scene to the media essence of the selected scene. In an exemplary aspect, the best or optimal one or more scripts (based on historical user preferences, for example) are preferably queued to the operator on the user interface.

In response to the user's selections, the controller 210, which can be considered a program generator, can be configured to receive this user input that selects the predefined macros and apply the corresponding script to the selected scene of the media content stream for a media production by applying the at least one media production function to the selected scene. In an exemplary aspect, the user input can be received as a touchscreen and touch input, voice activated, and/or based on human sensor activation of a selection (e.g., eye tracking information).

As described above, the selected script can execute one or more media processing functions (e.g., transitions, effects or the like) to generate a show based on the scene. The controller 210 can then be configured to compile each show as part of a video production that can be distributed to content consuming devices, such as receivers 117A and 117B using the infrastructure described above with respect to FIG. 1.

As yet further shown in FIG. 2, the virtualized production switcher 101 can include a script profiler 230 that is configured to track metadata related to the selected scene and update the script database 225 to store a correspondence between the selected scene and the selected predefined macro. More particularly, the script profiler 230 can be configured to monitor which predefined script is selected by an operator for a given scene and/or to produce a particular show. The script profiler 230 can be configured to generate and/or collect metadata that relates to at least one of a type of content, an image recognized in the content (as described above) and a camera profile used to capture the respective media content, for example.

In turn, the script optimizer 220 can also be configured to update the subset of the plurality of predefined macros in the script database 225 to be presented on the user interface based on the correspondence provided by the script profiler 230. That is, the script profiler 230 enables a machine learning or artificial intelligence aspect to customization and/or optimization of presentation of predefined scripts to the operator based on historical operations of the user for video production based on the context of the media essence used to produce the show. As a result, the script optimizer 220 can also be configured to present the updated subset of predefined macros on the user interface when another (e.g., subsequent) media stream is displayed on the user interface that has metadata the matches the identified metadata. Thus, in one aspect, a user can be presented with a configuration interface to manually select scripts, scenes, shots and macros and, in addition, also be provided with an option to request recommended scripts based on the machine learning feature to enable the customization of presentation of predefined scripts.

Effectively, as the operator continues to produce shows for video production in a given space (e.g., for producing sporting games, news broadcasts, or the like), the virtualized production switcher is configured as a dynamic feedback loop that is configured to build a customized profile for the user and/or video production to generate a subset of predefined macros with scene scripts of easing the video production process by the TD. Thus, the virtualized production switcher leverages the data model representation of the scene, shots, and show, which are represented by a model in the user interface that exposes key attributes that allow the system to perform machine learning for the video production of the media content.

Figure 3A:
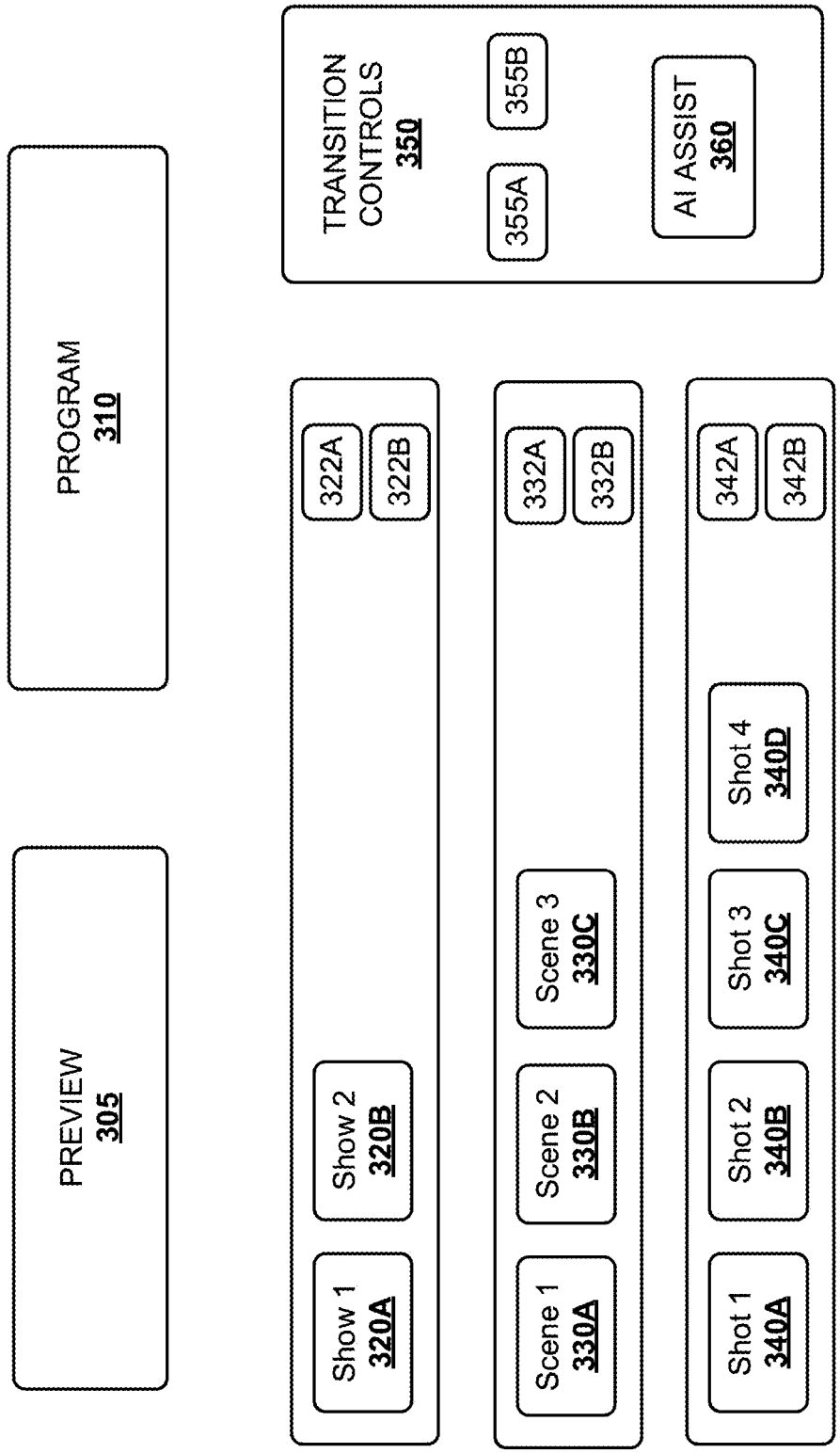
FIG. 3A illustrates an example of the user interface displayed on screen according to an exemplary embodiment.
Figure 3B:
FIG. 3B illustrates an example of a screenshot the user interface screen according to an exemplary embodiment.

As also described above, the system is configured to generate a user interface for the virtualized production switcher that enables an operator to dynamically select predefined scripts for scenes during video production. FIG. 3A illustrates an example of the user interface displayed on screen 205 according to an exemplary embodiment. FIG. 3B illustrates an example of the user interface screen according to an exemplary embodiment. More particularly, FIG. 3B shows a screenshot of an example of the block diagram for a screen 205 as shown in FIG. 3A As shown, the user interface 302B can include a preview 305 of the production and a display of the actual program 310 that is currently being output by the virtualized production switcher 101. In one aspect, the preview 305 can display the resulting show that is generated based on the execution of the particular processing functions defined by the selected macro and applied to a selected scene.

Moreover, the user interface 302B can display each of a plurality of the shots 340A to 340D, a plurality of scenes 330A to 330C and a plurality of shows 320A and 320B. It is noted that the number of shots, scenes and shows is not limited to those shown in FIG. 3A, which is provided only for exemplary purposes. As described above, the shots 340A to 340D are the building blocks of a scene and can include live or prerecorded content as well as graphics, logos and the like. The shots 340A to 340D can be presented with a plurality of design operation icons 342A-342B (not limited to two operations) that enable an operator to add shots, copy shots, delete shots and/or edit shots. The scenes 330A to 330C can be presented with a plurality of design operation icons 332A-332B (not limited to two operations) that enable an operator to add scenes, copy scenes, delete scenes and/or edit scenes. Finally, the shows 320A to 320C can be presented with a plurality of design operation icons 322A-322B (not limited to two operations) that enable an operator to add shows, copy shows, delete shows and/or edit shows. Thus, at each level, the user can select a particular shot, scene or show and then select a resulting operation to perform the operation on the selected entity.

As further shown, the user interface 302B can be configured to present a plurality of transition controls 350 that can be one or more of the predefined macros as described above for purposes of enabling the user to select a script. For example, transition controls 355A and 355B (not limited to two controls) can be transitions such as a cut or controls on the speed of the transition (e.g., slow, medium or fast). Moreover, the transition controls 350 can include an AI assist control operation 360 that enables the operator to request a presentation of one or more of the predefined macros or, in the alternative, instructs the system to selected the optimal scene based on the machine learning operations as described above in the specific context of the media essence. That is, when the user selects the AI assist button 360, the user interface 302B can be configured to present one or more predefined macros for the user to select to perform the desired function on the media content (e.g., program 310).

According to an exemplary aspect, because the functions of the macro can be used as the "compiled form" of the script, then optimization, equivalence, provides the ability to learn as described above. That is, the script can be learned, the equivalent/optimal implementation can be learned, and so now, the output of the media production system can be dynamically optimized. Thus, using the virtualized production switcher, scripts can be deduced and suggested for use using the AI assist control operation 360 for transitions, but also for sources and effectively any variable that is part of the script. In one example, scene scripts can be offered by the script optimizer 220 as described above for consideration and selection, such as camera angles of the media essence. Next, a given operator can be analyzed to determine details, such as camera angles based on what the operator has chosen before for a similar program or shoot as also described above using the script profiler 230. As a result, the AI assist control operation 360 provides a great customization that is tailored to the specific operator and the specific type of content (or recognized items within the content) to facilitate script selection of media content production.

Figure 4:
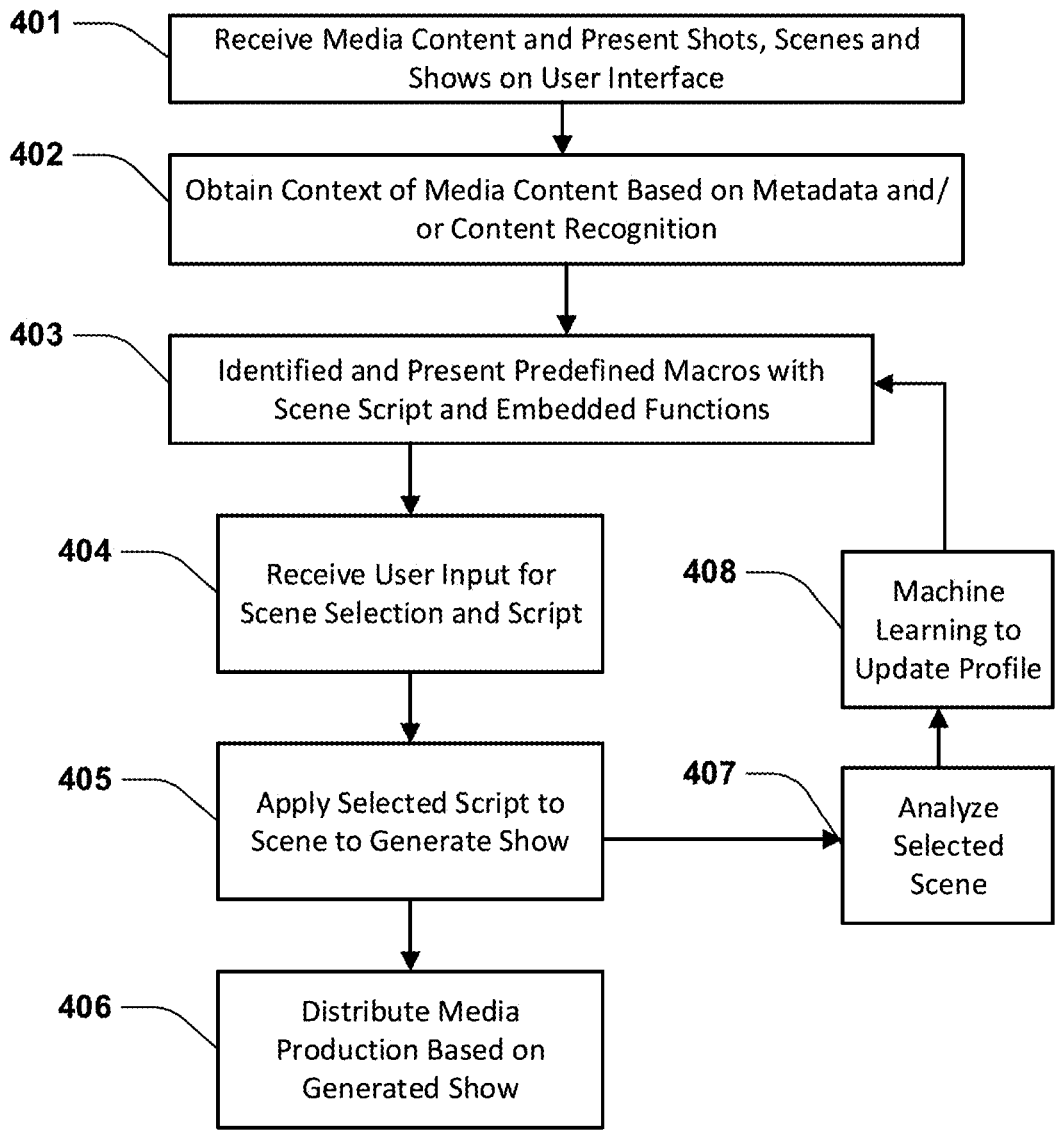
FIG. 4 illustrates a flowchart for a method for providing a virtualized production switcher for media production according to an exemplary embodiment.

FIG. 4 illustrates a flowchart for a method for providing a virtualized production switcher for media production according to an exemplary embodiment. In general, it should be appreciated that the method 400 can be performed using one or more of the exemplary systems and components described above with respect to FIGS. 1-3.

As shown, initially at step 401, the virtualized production switcher 101 receives media content (e.g., media feeds and/or video streams) of media essence and is configured to present a user interface that includes shots, scenes and shows as described above for the media content. Next, at step 402, the virtualized production switcher 101 (e.g., video content analyzer 215) is configured to determine a context for the media essence based on relative metadata, content recognition or the like. Based on the context of the media content, the virtualized production switcher 101 (e.g., script optimizer 220) is configured to present one or more predefined macros for scene scripts that are selectable by the user to perform a video processing operation, such as a video effect, video transition, or the like as described above.

Moreover, the virtualized production switcher 101 receives a user input of the selected scene and a selected script (of the predefined macros) at step 404, which can then be executed by controller 210 as also described above. The media production can then be distributed at step 406 using an existing media distribution infrastructure (e.g., system 100 of FIG. 1). In parallel, the script optimizer 220 can be configured to analyze the selected scene and applied script at step 407 to determine a correspondence that is then used at step 408 for the machine learning to update profile information and corresponding subsets of predefined macros as also described above. By doing so, the exemplary method 400 provides a customizable and virtualized production switching environment that is tailored to the specific operator and the specific type of content (or recognized items within the content) to facilitate script selection of media content production.

Figure 5:
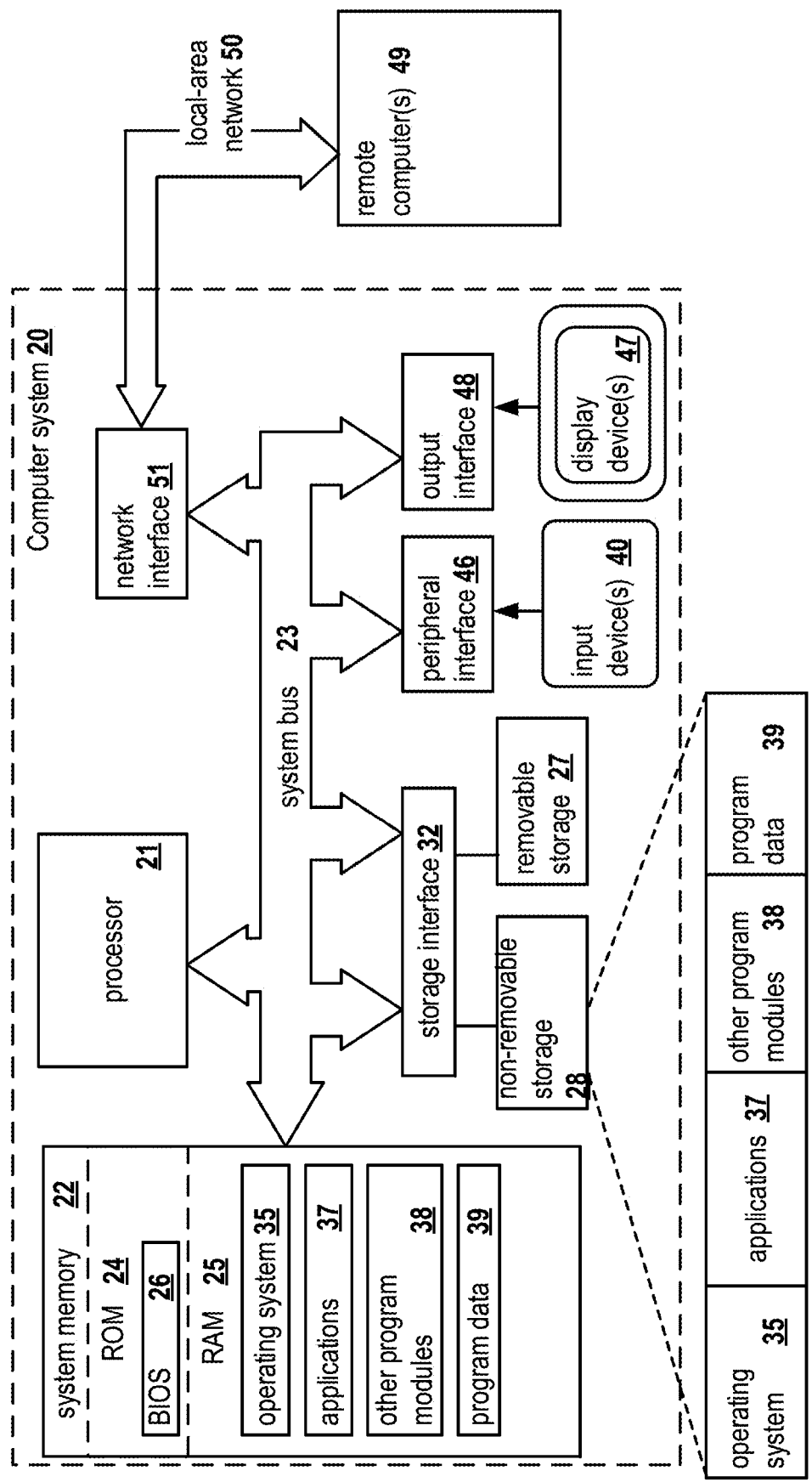
FIG. 5 is a block diagram illustrating a computer system on which aspects of systems and methods for providing a virtualized production switcher for media production according to an exemplary embodiment.

FIG. 5 is a block diagram illustrating a computer system on which aspects of systems and methods for providing a virtualized production switcher for media production according to an exemplary embodiment. It should be noted that the computer system 20 can correspond to any computing system configured to execute the virtualized production switcher or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to scene script database 225, for example.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices as described above with respect to FIG. 1 as well as generally to a cloud computing platform for configuring the media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. As described above, a module can refer to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIGS. 1 and 2, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A virtualized production switcher for media production comprising:
 a memory; and
 a processor configured to implement instructions on the memory so as to provide:
  a script database configured to store a plurality of predefined macros that each define a script for applying at least one media production function to media content;
  a receiver configured to receive at least one media content stream that includes a plurality of scenes and a plurality of shots for the media production;
  a display screen configured to provide a user interface that displays at least a portion of the respective scenes of the at least one media stream;
  a script optimizer configured to select of a subset of the plurality of predefined macros that are presented on the user interface as suggested scripts for each scene of the at least one media stream;
  a program generator configured to receive a user input that selects one of the predefined macros and to apply the corresponding script to a selected scene of the at least one media content stream for a media production by applying the at least one media production function to the selected scene based on an identified key-frame thereof;
  a script profiler configured to identify metadata related to the selected scene and update the script database to store a correspondence between the selected scene and the selected predefined macro, wherein the metadata relates to at least one of a type of content, an image recognized in the content and a camera profile used to capture the respective media content;

wherein the script optimizer is configured to update the subset of the plurality of predefined macros to be presented on the user interface based on the correspondence and present the updated subset of predefined macros on the user interface when another media stream is displayed on the user interface that has metadata that matches the identified metadata.

2. The virtualized production switcher according to claim 1, wherein the plurality of predefined macros comprise a plurality of data types and classes that define a structure and function to execute the at least one media production function on the media content.

3. The virtualized production switcher according to claim 2, wherein the at least one media production function comprises at least one of a parametric control, a video level control, and a transition for the media content.

4. The virtualized production switcher according to claim 1, further comprising a user interface generator configured to separate the media content into plurality of scenes and shows and to generate the user interface to display the plurality of scenes for the at least one media content stream, which is determined based on a key-frame for each sequence of the media content.

5. The virtualized production switcher according to claim 1, wherein the script profiler includes a content analyzer configured to determine at least one of audio triggers and video content recognition features to identify the metadata relating to media essence of the selected scene.

6. The virtualized production switcher according to claim 1, wherein the script optimizer is configured to update the selected subset of the plurality of predefined macros that are presented on the user interface using machine learning or artificial intelligence to customize the suggested scripts presented on the user interface based on historical operations of applying the at least one media production function for the media production.

7. The virtualized production switcher according to claim 6, wherein the script optimizer is configured as a dynamic feedback loop that builds a customized profile for video production to generate the subset of the plurality of predefined macros to be presented on the user interface.

8. A virtualized production switcher for media production comprising:
a memory; and
a processor configured to implement instructions on the memory so as to provide:
a script database configured to store a plurality of predefined macros that each define a script for applying at least one media production function to media content;
a display screen configured to provide a user interface that displays a plurality of scenes of a media stream of the media content;
a script optimizer configured to select of a subset of the plurality of predefined macros that are presented on the user interface as suggested scripts for each of the plurality of scenes;
a program generator configured to receive a user input that selects one of the predefined macros and to apply the corresponding script to a selected scene of the media stream for a media production by applying the at least one media production function to the selected scene based on an identified key-frame thereof;
a script profiler configured to identify metadata related to the selected scene and update the script database to store a correspondence between the selected scene and the selected predefined macro;

wherein the script optimizer is configured to update the subset of the plurality of predefined macros to be presented on the user interface based on the correspondence and present the updated subset of predefined macros on the user interface when another media stream is displayed on the user interface that comprises metadata related to the identified metadata.

9. The virtualized production switcher according to claim 8, wherein the metadata relates to at least one of a type of content, an image recognized in the content and a camera profile used to capture the respective media content.

10. The virtualized production switcher according to claim 8, wherein the plurality of predefined macros comprise a plurality of data types and classes that define a structure and function to execute the at least one media production function on the media content.

11. The virtualized production switcher according to claim 10, wherein the at least one media production function comprises at least one of a parametric control, a video level control, and a transition for the media content.

12. The virtualized production switcher according to claim 8, further comprising a user interface generator configured to separate the media content into the plurality of scenes and a plurality of shows and to generate the user interface to display the plurality of scenes and shows for the media stream, which is determined based on a key-frame for each sequence of the media content.

13. The virtualized production switcher according to claim 8, wherein the script profiler includes a content analyzer configured to determine at least one of audio triggers and video content recognition features to identify the metadata relating to media essence of the selected scene.

14. The virtualized production switcher according to claim 8, wherein the script optimizer is configured to update the selected subset of the plurality of predefined macros that are presented on the user interface using machine learning or artificial intelligence to customize the suggested scripts presented on the user interface based on historical operations of applying the at least one media production function for the media production.

15. The virtualized production switcher according to claim 14, wherein the script optimizer is configured as a dynamic feedback loop that builds a customized profile for video production to generate the subset of the plurality of predefined macros to be presented on the user interface.

16. A virtualized production switcher for media production comprising:
a memory; and
a processor configured to implement instructions on the memory so as to provide:
a script database configured to store a plurality of predefined macros that each define a script for applying at least one media production function to media content;
a script optimizer configured to select of a subset of the plurality of predefined macros to be presented on a user interface as suggested scripts for each of a plurality of scenes of a media stream;
a program generator configured to receive a user input via the user interface that selects one of the predefined macros and to apply the corresponding script to a selected scene of the media stream for a media production by applying the at least one media production function to the selected scene based on an identified key-frame thereof;
a script profiler configured to identify metadata related to the selected scene and update the script database to store a correspondence between the selected scene and the selected predefined macro;

wherein the script optimizer is configured to update the subset of the plurality of predefined macros to be presented on the user interface based on the correspondence.

17. The virtualized production switcher according to claim 16, wherein the script optimizer is further configured to present the updated subset of predefined macros on the user interface when another media stream is displayed on the user interface that comprises metadata related to the identified metadata.

18. The virtualized production switcher according to claim 16, further comprising a display screen configured to provide the user interface that displays the plurality of scenes of the media stream.

19. The virtualized production switcher according to claim 16, wherein the metadata relates to at least one of a type of content, an image recognized in the content and a camera profile used to capture the respective media content.

20. The virtualized production switcher according to claim 16, wherein the plurality of predefined macros comprise a plurality of data types and classes that define a structure and function to execute the at least one media production function on the media content.

21. The virtualized production switcher according to claim 20, wherein the at least one media production function comprises at least one of a parametric control, a video level control, and a transition for the media content.

22. The virtualized production switcher according to claim 16, further comprising a user interface generator configured to separate the media content into the plurality of scenes and a plurality of shows and to generate the user interface to display the plurality of scenes and shows for the media stream, which is determined based on a key-frame for each sequence of the media content.

23. The virtualized production switcher according to claim 16, wherein the script profiler includes a content analyzer configured to determine at least one of audio triggers and video content recognition features to identify the metadata relating to media essence of the selected scene.

24. The virtualized production switcher according to claim 16, wherein the script optimizer is configured to update the selected subset of the plurality of predefined macros that are presented on the user interface using machine learning or artificial intelligence to customize the suggested scripts presented on the user interface based on historical operations of applying the at least one media production function for the media production.

25. The virtualized production switcher according to claim 24, wherein the script optimizer is configured as a dynamic feedback loop that builds a customized profile for video production to generate the subset of the plurality of predefined macros to be presented on the user interface.

* * * * *